(12) United States Patent
Brück et al.

(10) Patent No.: US 8,459,652 B2
(45) Date of Patent: Jun. 11, 2013

(54) BRUSH SEAL FOR A TURBO-MACHINE

(75) Inventors: Stefan Brück, Mülheim an der Ruhr (DE); Matthias Neef, Mülheim an der Ruhr (DE); Erik Sulda, Hatfield, MA (US); Norbert Sürken, Mülheim a.d. Ruhr (DE)

(73) Assignee: Siemens Aktiengesellschaft, München (DE)

( * ) Notice: Subject to any disclaimer, the term of this patent is extended or adjusted under 35 U.S.C. 154(b) by 901 days.

(21) Appl. No.: 12/310,218

(22) PCT Filed: Aug. 13, 2007

(86) PCT No.: PCT/EP2007/058353
§ 371 (c)(1),
(2), (4) Date: Oct. 23, 2009

(87) PCT Pub. No.: WO2008/020002
PCT Pub. Date: Feb. 21, 2008

(65) Prior Publication Data
US 2010/0068042 A1    Mar. 18, 2010

(30) Foreign Application Priority Data
Aug. 18, 2006    (EP) .................................... 06017253

(51) Int. Cl.
*F16J 15/44*    (2006.01)

(52) U.S. Cl.
USPC ......................................................... 277/355

(58) Field of Classification Search
USPC ........................................................ 277/355
See application file for complete search history.

(56) References Cited

U.S. PATENT DOCUMENTS

| | | | |
|---|---|---|---|
| 885,032 A | | 4/1908 | Ferranti |
| 3,745,053 A | * | 7/1973 | Johnson et al. .................. 428/85 |
| 4,580,346 A | * | 4/1986 | Reichl .............................. 33/705 |
| 5,106,104 A | | 4/1992 | Atkinson et al. |
| 5,201,530 A | | 4/1993 | Kelch et al. |
| 6,308,957 B1 | * | 10/2001 | Wright .......................... 277/355 |
| 6,808,179 B1 | | 10/2004 | Bhattacharyya et al. |

FOREIGN PATENT DOCUMENTS

| | | |
|---|---|---|
| EP | 0992721 A1 | 4/2000 |
| EP | 1388695 A2 | 2/2004 |
| GB | 2355049 A | 4/2001 |

* cited by examiner

*Primary Examiner* — Vishal Patel

(57) ABSTRACT

A brush seal for a turbo-machine for sealing a gap between a rotating and a stationary component is disclosed. Elastically flexible bristles are arranged in a plurality of rows that are adjacent to each other. A film or a disk is arranged between at least two rows of bristles, the film or the disk extending in the longitudinal direction of said bristles.

14 Claims, 4 Drawing Sheets

FIG 3
(Prior Art)
FIG 4
(Prior Art)
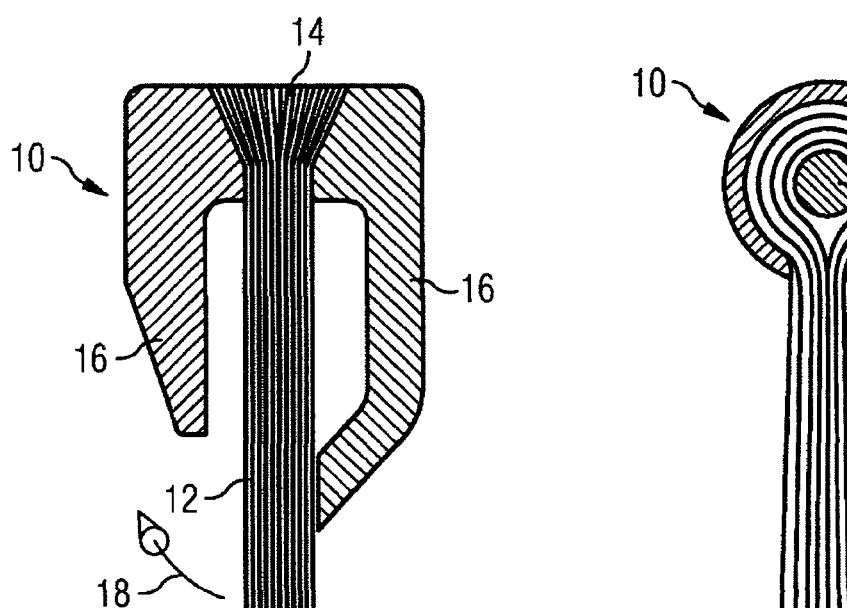
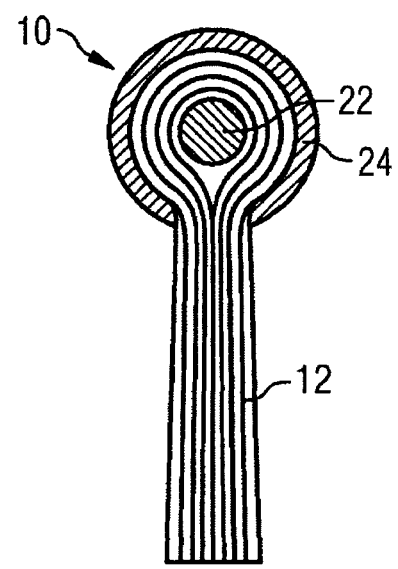
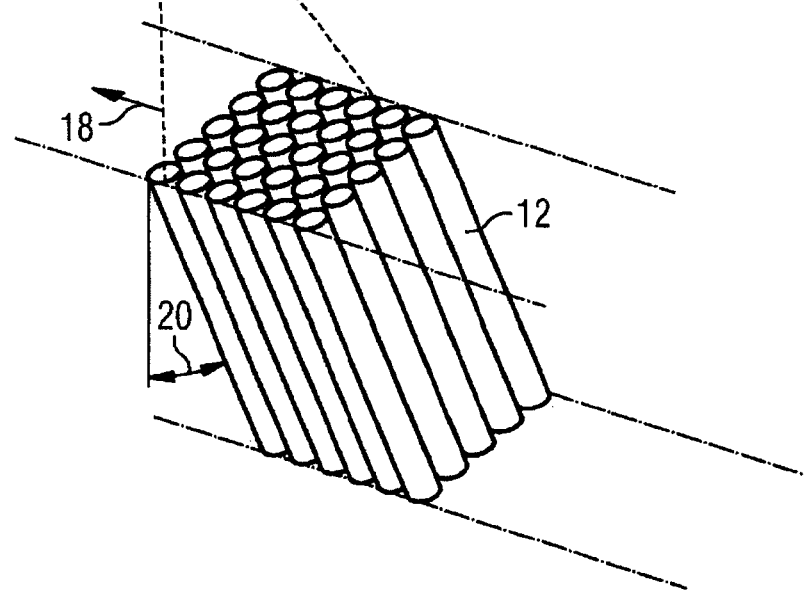

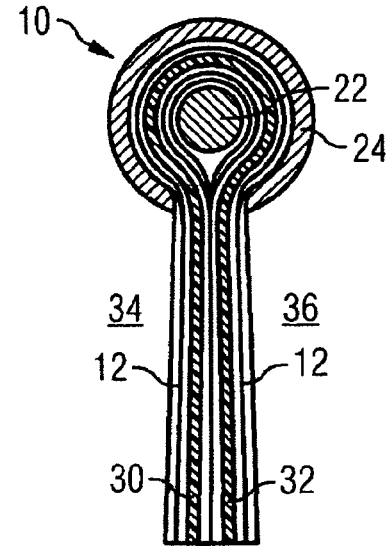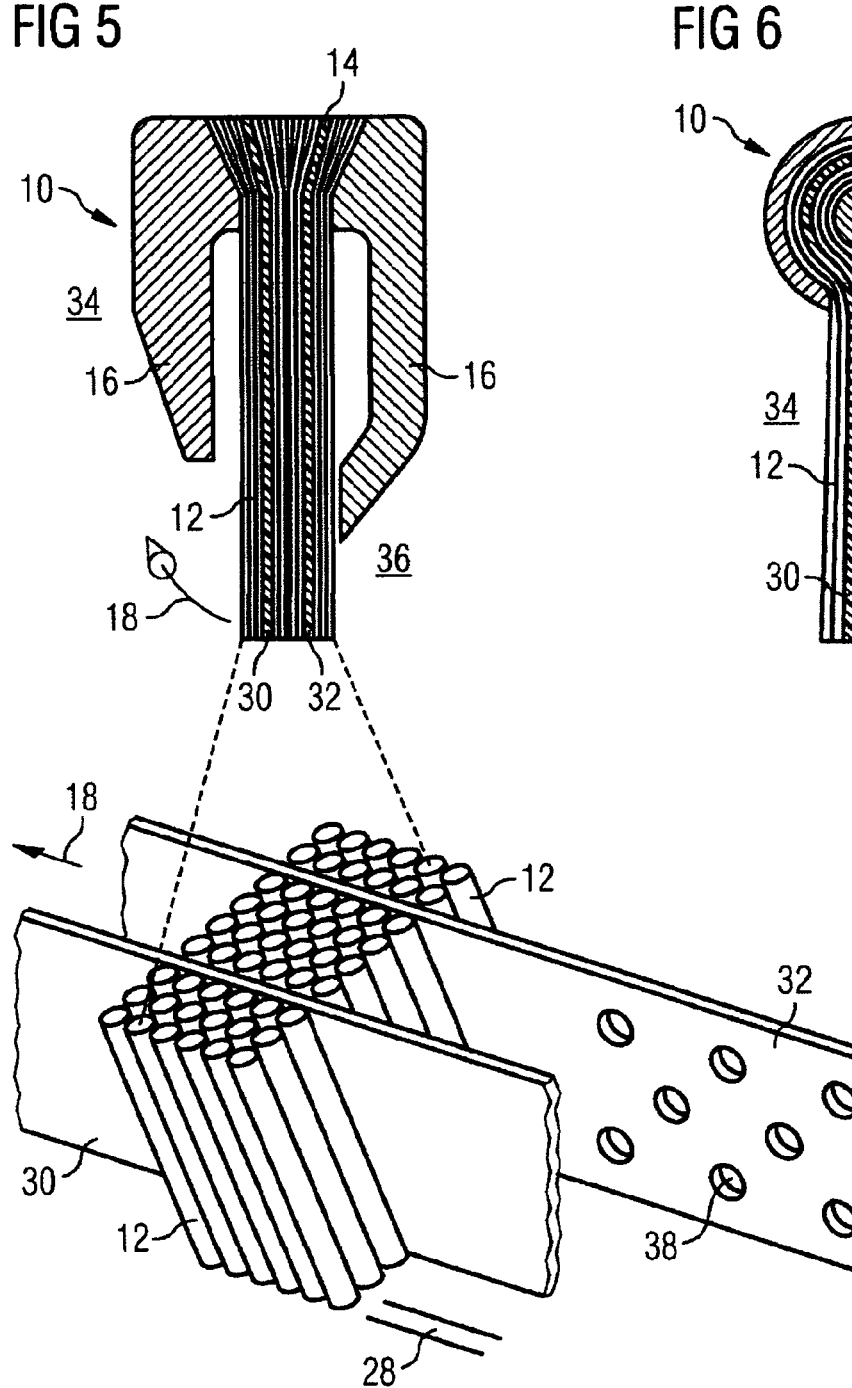

BRUSH SEAL FOR A TURBO-MACHINE

CROSS REFERENCE TO RELATED APPLICATIONS

This application is the US National Stage of International Application No. PCT/EP2007/058353 filed Aug. 13, 2007 and claims the benefit thereof. The International Application claims the benefits of European patent application No. 06017253.3 EP filed Aug. 18, 2006, both of the applications are incorporated by reference herein in their entirety.

FIELD OF INVENTION

The invention relates to a brush seal for a turbo-machine for sealing off a gap between a rotating and a stationary component of the turbo-machine, in which brush seal elastically flexible bristles are provided in a plurality of bristle rows arranged next to one another.

BACKGROUND OF INVENTION

In turbo-machines having rotating and stationary components, sealing elements of various types of construction are used for sealing off various pressure spaces. In this case, in particular, contactless seals (for example, labyrinth seals) or resilient contacting sealing elements are used between the rotating and the stationary components. The resilient contacting sealing elements include, inter alia, what are known as brush seals in which bristles are used for a sealing off between spaces having different pressures.

Whereas contactless seals are suitable for sealing off pressure differences of a few millibars up to several hundred bars, the range of use of brush seals, even in the multistage arrangement (a plurality of brush seals one behind the other), is limited in respect of the maximum pressure difference on account of the "blow-over effect" and a "fanning open".

The "blow-over effect" is made clear in FIG. 1 by a cross-sectional illustration of a brush seal 10 according to the prior art. In this brush seal 10, bristles 12 are arranged in a plurality of rows and are fastened in a basic body 14. The basic body 14 is framed on two opposite sides in each case by a guide plate 16, of which the guide plate 16 illustrated on the right in FIG. 1 extends so far to the lower end region of the bristles 12 that it supports the bristles 12 there. In the case of a correspondingly high pressure difference "$p_1 \gg p_2$" at the brush seal 10, however, the bristles 12 are bent at this lower end region to an extent such that medium can flow from the pressure space located on the left in FIG. 1 over into the pressure space located on the right.

FIG. 2 makes clear the "fanning open" of a brush seal 10 by means of a cross-sectional illustration corresponding to that of FIG. 1. In "fanning open", because of an unfavorable flow against the lower end region of the bristles 12, individual bristles are bent up toward the left-hand pressure space, so that, once again, medium can pass out of this pressure space, which is under a pressure $p_1$, into the right-hand pressure space which is under a lower pressure $p_2$.

In order to increase the performance of known brush seals, in previous solutions the individual bristles are designed to be comparatively thick, the individual bristle bundles are held by a guide plate or a supporting ring (see FIGS. 1 and 2, the right guide plate 16) and/or the individual bristle bundle, overall, is designed to be relatively wide or thick.

SUMMARY OF INVENTION

Nevertheless, the abovementioned limits continue to be placed on the tolerable pressure difference of known brush seals. In particular, because of the radial play necessary between the rotating and the stationary components, the bristles cannot be supported as near as is desired to an opposite component by means of a guide plate or a supporting ring.

An object of the present invention is to improve a brush seal of the type initially mentioned, to the effect that higher pressure differences can be sealed off in a turbo-machine equipped with it.

The object is achieved, according to the invention, by means of a brush seal and a turbo-machine according to the independent claims. Advantageous developments of the invention are defined in the dependent claims.

The brush seal for a turbo-machine for sealing off a gap between a rotating and a stationary component of the turbo-machine has the initially mentioned elastically flexible bristles in a plurality of bristle rows arranged next to one another, the brush seal being of single-stage design. Furthermore, a film or a disk or membrane, which extends in the longitudinal direction of the bristles, is arranged between at least two bristle rows.

A single-stage brush seal is characterized in that a plurality of bristles is arranged in an essentially contacting manner over their length, and a bristle bundle is thereby formed. A single-stage brush seal is thus distinguished by a bristle bundle comprising a plurality of bristles lying close to one another.

A further feature of a single-stage brush seal is the fastening of the bristles in a brush seal holder, the bristle ends arranged in the brush seal holder lying close to one another.

Multistage brush seals are distinguished by at least two spatially separated bristle bundles arranged one behind the other, the respective bristle bundles, as a rule, not being in contact with one another.

The brush seal therefore has at least one intermediate layer in the form of a film or of a disk between the individual bristle rows of its bristle bundles. The disk may in this case be, in particular, a thin plate. What is achieved by such films or disks is that the individual bristles and the intermediate layers support one another. The risk of a bending of bristles around the edge of a guide plate (see FIG. 1) or of a fanning open of bristles (see FIG. 2) is greatly reduced. Thus, the brush seal is suitable also for the higher pressure differences. The fanning open of individual bristles due to a swirling flow against a brush seal can be reduced, in particular on the inflow side, by means of the films or disks.

So that the film or disk can be cost-effectively attached to and permanently held on the brush seal, it is preferable to attach the bristles fixedly with an end region to a basic body and to hold the film or disk with a marginal region between the bristles, likewise by means of this basic body.

The film or disk preferably consists of a material having abrasive properties. Thus, the film or disk may be exactly as long as the bristles, with the result that the rigidity of the bristle tips is increased and a bending of the bristles around the edge of the guide plate is thereby greatly reduced.

The film or disk is in this case advantageously produced from a metal matrix or from graphite.

The film or disk is preferably produced from plastic and/or metal. By means of materials of this type, the desired supporting effects can be achieved cost-effectively, depending on the required operating temperature of the brush seal.

Furthermore, it is preferable for the film or disk to have at least in portions a perforated configuration and/or to have at least in portions a slotted configuration. By means of brush seals of this type, the "blow-down effect" of the brush seal (that is to say, the closing of the brush seal by means of radial pressure forces on the associated bristle bundle) can be maintained.

Finally, it is preferable for the film or disk to be configured, in terms of the longitudinal extent of the bristles, exactly as long as these and/or shorter than these. Furthermore, the package of bristles with an associated film or disk, can be stacked as often as desired and made as thick as desired. The number of films or disks and their individual thickness may be varied, depending on the requirements of the sealing situation. The films or disks may be designed to be bedded in, injection-molded, heat-sealed, wound and/or clamped together with the associated bristles.

The film or disk preferably has a structure for supporting the bristles. By virtue of this measure which can be implemented comparatively easily, the rigidity of the plate can be further increased. In this case, the film or disk is essentially bent in its longitudinal direction, in order thereby to avoid distortion.

The film or disk is advantageously designed to be wavy in a sinusoidal, U-shaped or triangular manner.

BRIEF DESCRIPTION OF THE DRAWINGS

An exemplary embodiment of a brush seal according to the invention is explained in more detail below with reference to the accompanying diagrammatic drawings in which:

FIG. 3 shows a cross section and, underneath, a partially perspective view of an exemplary embodiment of a brush seal according to the prior art which corresponds to that of FIGS. 1 and 2, FIG. 4 shows a cross section of a further exemplary embodiment of a brush seal according to the prior art, FIG. 5 shows a cross section and, underneath, a partial perspective view of an exemplary embodiment of a brush seal according to the invention which is based on a brush seal according to FIG. 3, FIG. 6 shows a cross section of a further exemplary embodiment of a brush seal according to the invention which is based on a brush seal according to FIG. 4.

DETAILED DESCRIPTION OF INVENTION

Figure 1:
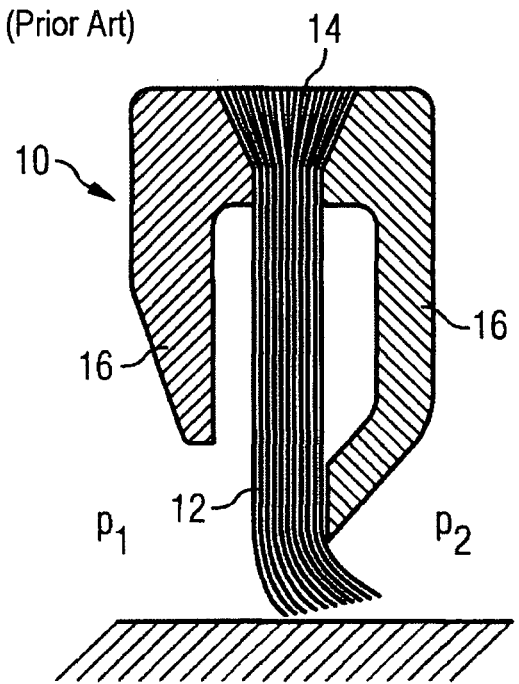
FIG. 1 shows a cross section of a brush seal according to the prior art for the above explanation of the "blow-over effect"
Figure 2:
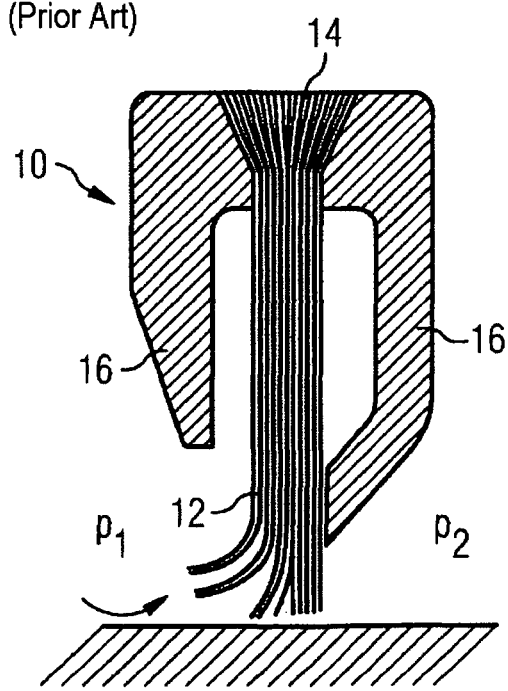
FIG. 2 shows a cross section of a brush seal according to the prior art for the above explanation of the "fanning open"

FIG. 3 makes clear a brush seal 10 of the prior art which has bristles 12 extending essentially parallel and together forming a bristle bundle. The bristles 12 are embedded into a basic body 14 which is located between two guide plates 16. The guide plates 16 extend individually in the longitudinal direction of the bristles 12, the guide plate 16 located on the right with respect to FIG. 3 being curved with its lower end region in the direction of the bristles 12 and supporting the bristles 12 at their lower end region. When the brush seal 10 of this type is rotated in the direction of an arrow 18, the lower end regions of the bristles 12, with respect to FIG. 3, undergo frictional resistance against an opposite stationary component (not illustrated in any of FIGS. 3 to 6), and the bristles 12 are thereby curved at an angle 20 opposite to their main direction of movement.

FIG. 4 makes clear an exemplary embodiment of a brush seal 10 according to the prior art in which bristles 12 are laid around a central wire 22 and are surrounded on the outside by a shell 24 of essentially circular cross section. The bristles 12 project out of this shell 24 downward with respect to FIG. 4 in the direction of a stationary component (not illustrated).

FIG. 5 makes clear an exemplary embodiment of a brush seal 10 which likewise has bristles 12, a basic body 14 and two guide plates 16. The brush seal 10 likewise rotates in the direction of an arrow 18. The bristles 12 are in this case arranged essentially parallel to one another in bristle rows 28, and, overall, two films 30 and 32 are located between these bristle rows 28. The film 30, which in, this case faces a pressure space 34 having comparatively low pressure, is designed to be closed in its film surface. By contrast, the film 32 which faces a pressure space 36 having comparatively high pressure has a configuration perforated by means of orifices 38.

FIG. 5 shows a single-stage brush seal 10. The two films 30 and 32 are produced from a material having abrasive properties. In this case, a metal matrix or graphite may serve as abrasive material.

Figure 7:
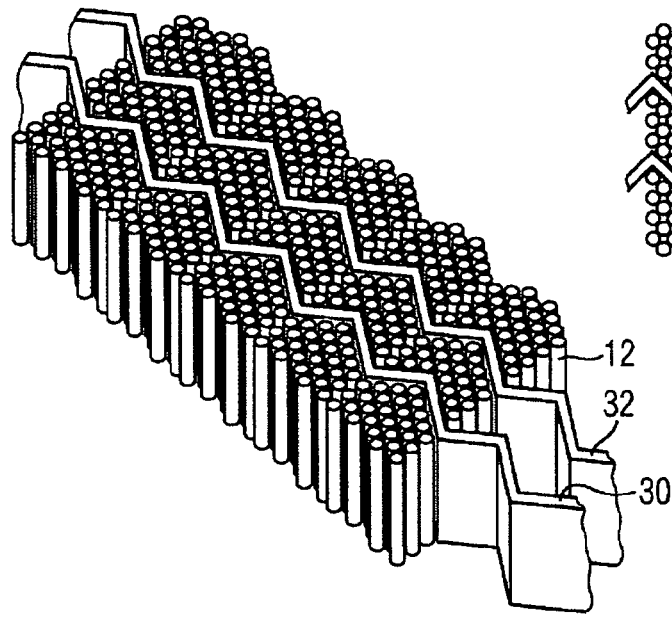
FIG. 7 shows a partial perspective view of an exemplary embodiment of a brush seal according to the invention with a wavy structure of the disk.

FIG. 7 shows a brush seal, the film 30, 32 having a structure for supporting the bristles 12. The perspective illustration of the brush seal according to FIG. 7 shows a triangular structure of the film 30, 32.

Figure 8:
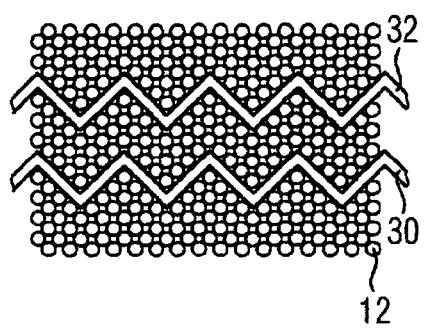
FIG. 8 shows a view from below, as seen in the longitudinal direction of the bristles, of an exemplary embodiment of a brush seal according to the invention.

In FIG. 8, the triangular structure is shown from below.

Figure 9:
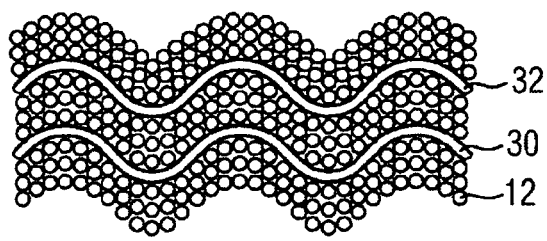
FIG. 9 shows a view from below, as seen in the longitudinal direction of the bristles, of an exemplary embodiment of a brush seal according to the invention.
Figure 10:
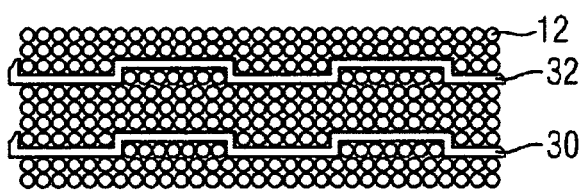
FIG. 10 shows a view from below, as seen in the longitudinal direction of the bristles, of an exemplary embodiment of a brush seal according to the invention.
Figure 11:
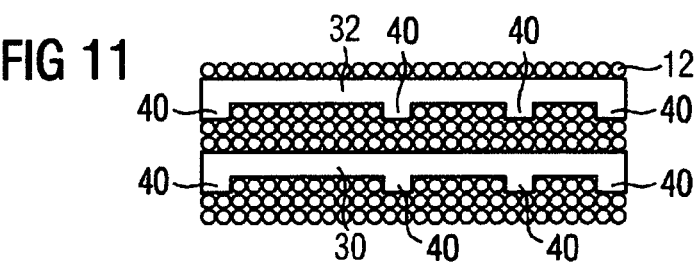
FIG. 11 shows a view from below, as seen in the longitudinal direction of the bristles, of an exemplary embodiment of a brush seal according to the invention.

FIG. 9 and FIG. 10 show respectively a sinusoidal and a U-shaped structure of the film 30, 32. The film 30, 32 according to FIG. 11 is improved by means of webs 40 which are formed in the longitudinal direction of the bristles, the rigidity of the film 30, 32 being increased.

FIG. 6 illustrates a further exemplary embodiment of a brush seal 10 which, in terms of bristles 12, a wire 22 and a shell 24, is configured in the same way as the exemplary embodiment of the prior art, as illustrated in FIG. 4. In the exemplary embodiment according to FIG. 6, however, a film 30 is located, furthermore, between the bristles 12 laid around the wire 22, so that, in the region of the bristles projecting out of the shell 24, the layering of bristles 12 and film(s) 30 and/or 32, made clear in the perspective view at the bottom of FIG. 5, is obtained once again.

The invention claimed is:

1. A single stage annular brush seal for a turbo machine for sealing off a gap between a rotating component and a stationary component of the turbo machine, comprising:

a front plate and a back plate, elastically flexible bristles provided in a plurality of bristle rows arranged next to one another between the front plate and the back plate, wherein the plurality of bristle rows comprise at least three circumferentially-arrayed bristle rows;

a first film or a first disk arranged circumferentially between first and second bristle rows of the at least three bristle rows, wherein the first film or the first disk consists of a material having abrasive properties, wherein the first film or the first disk has a closed surface; and a second film or a second disk arranged circumferentially between the second and a third bristle row of the at least three bristle rows, wherein the second film or the second disk consists of the material having abrasive properties, wherein the second film or the second disk has a perforated configuration with through orifices in at least portions thereof, and wherein the first film or the first disk and the second film or the second disk and the at least three bristle rows have a same height and length.

2. The brush seal as claimed in claim 1, wherein the bristles are attached fixedly with an end region to a basic body, and the first and second film or the first and second disk are held with a marginal region between the bristles.

3. The brush seal as claimed in claim 1, wherein the first and second film or the first and second disk are produced from a metal matrix or from graphite.

4. The brush seal as claimed in claim 1, wherein the first and second film or the first and second disk are produced from plastic.

5. The brush seal as claimed in claim 1, wherein the first and second film or the first and second disk are produced from metal.

6. The brush seal as claimed in claim 1, wherein the second film or the second disk has at least in portions a slotted configuration.

7. The brush seal as claimed in claim 1, wherein the first and second film or the first and second disk have a structure for supporting the bristles.

8. The brush seal as claimed in claim 7, wherein the first and second film or the first and second disk are shaped with a wavy configuration over a length of the first and second film or the first and second disk arranged between the respective at least two bristle rows.

9. The brush seal as claimed in claim 8, wherein the wavy con-figuration of the first and second film or the first and second disk is a sinusoidal, U shaped or triangular wavy configuration.

10. A turbo machine, comprising:
a rotating component;
a stationary component;
a single stage annular brush seal for sealing off a gap between the rotating component and the stationary component, the single-stage brush seal comprising:
a front plate and a back plate,
elastically flexible bristles provided in a plurality of bristle rows arranged next to one another between the front plate and the back plate, wherein the plurality of bristle rows comprise at least three circumferentially-arrayed bristle rows,
a first film or a first disk arranged circumferentially between first and second bristle rows of the at least three bristle rows, wherein the first film or the first disk consists of a material having abrasive properties and wherein the film or the disk has a closed surface, and
a second film or second disk arranged circumferentially between the second and a third bristle row of the at least three bristle rows, wherein the second film or the second disk consists of the material having abrasive properties, wherein the second film or the second disk has a perforated configuration with through orifices in at least portions thereof, and
wherein the first film or the first disk and the second film or second disk and the at least three bristle rows have a same height and length.

11. The brush seal as claimed in claim 10, wherein the bristles are attached fixedly with an end region to a basic body, and the film or disk is held with a marginal region between the bristles, likewise by means of this basic body.

12. The brush seal as claimed in claim 10, wherein the film or disk is produced from a metal matrix or from graphite.

13. The brush seal as claimed in claim 10, wherein the film or disk is produced from plastic.

14. The brush seal as claimed in claim 10, wherein the film or disk is produced from metal.

* * * * *